United States Patent
Miyata et al.

(10) Patent No.: US 7,346,262 B2
(45) Date of Patent: Mar. 18, 2008

(54) VIDEO RECORDER/REPRODUCER AND VIDEO RECORDING/REPRODUCING METHOD USING A RECORDING STOP REQUEST

(75) Inventors: Kazunori Miyata, Neyagawa (JP); Tetsuro Yabumoto, Kyotanabe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1118 days.

(21) Appl. No.: 10/204,467

(22) PCT Filed: Feb. 19, 2002

(86) PCT No.: PCT/JP01/01180

§ 371 (c)(1),
(2), (4) Date: Aug. 21, 2002

(87) PCT Pub. No.: WO01/63918

PCT Pub. Date: Aug. 30, 2001

(65) Prior Publication Data

US 2003/0007779 A1    Jan. 9, 2003

(30) Foreign Application Priority Data

Feb. 22, 2000   (JP)   .............................. 2000-044066

(51) Int. Cl.
  *H04N 7/00* (2006.01)
  *H04N 7/26* (2006.01)
(52) U.S. Cl. ........................................ 386/46; 386/111
(58) Field of Classification Search .................. 386/46, 386/109, 96, 104, 33, 124–125, 111
See application file for complete search history.

(56) References Cited

U.S. PATENT DOCUMENTS

| 5,216,552 | A | * | 6/1993 | Dunlap et al. | ................. 386/96 |
| 5,453,967 | A | * | 9/1995 | Aramaki et al. | ......... 369/47.11 |
| 5,661,823 | A | * | 8/1997 | Yamauchi et al. | .......... 382/239 |
| 6,169,843 | B1 | * | 1/2001 | Lenihan et al. | ............... 386/46 |
| 6,278,834 | B1 | * | 8/2001 | Yagi et al. | .................... 386/54 |

FOREIGN PATENT DOCUMENTS

| JP | 6-189317 | * | 8/1991 |
| JP | H06-086203 | | 3/1994 |
| JP | H06-111477 | | 4/1994 |
| JP | H06-189317 | | 7/1994 |
| JP | H06-253250 | | 9/1994 |
| JP | 11-313281 A1 | | 11/1999 |

OTHER PUBLICATIONS

Notice of Rejection dated Dec. 24, 2003 issued by the Japan Patent Office.
English Translation of International Preliminary Examination Report mailed on Aug. 13, 2002.

* cited by examiner

*Primary Examiner*—Thai Q. Tran
*Assistant Examiner*—Daquan Zhao
(74) *Attorney, Agent, or Firm*—Westerman, Hattori, Daniels & Adrian, L.L.P.

(57) ABSTRACT

A video recorder/reproducer comprises means for continuing, when a recording stop request is inputted during a recording operation, an operation for reading out data from a memory and an operation for recording the data on a recording medium but stopping the writing of the data into the memory, and means for stopping the recording operation after the readout of the data finally written into the memory and the writing of the data into the recording medium are terminated.

3 Claims, 6 Drawing Sheets

VIDEO RECORDER/REPRODUCER AND VIDEO RECORDING/REPRODUCING METHOD USING A RECORDING STOP REQUEST

TECHNICAL FIELD

The present invention relates to a video recorder/reproducer such as a digital VTR and a video recording/reproducing method.

BACKGROUND ART

In a conventional analog VTR, when a recording stop request is generated during a recording operation, the recording operation may be immediately stopped. When a user presses a video recording stop button during the recording operation, the analog VTR immediately stops the recording operation.

A digital VTR that compresses a video picked up by a monitoring camera using a JPEG system image compression device, for example, then stores data representing the compressed video, reads out, when the data corresponding to a predetermined capacity are stored in the memory, the data from the memory, and records the read data on a video tape has already been developed.

In this type of digital VTR, when the recording operation is immediately stopped when the recording stop request is generated during the recording operation, the video data which have been stored in the memory until the recording stop request is generated and have not been recorded yet on the video tape are not recorded on the video tape.

An object of the present invention is to provide a video recorder/reproducer and a video recording/reproducing method, in which video data which have been stored in a memory until a recording stop request is generated can be recorded on a recording medium.

Another object of the present invention is to provide a video recorder/reproducer and a video recording/reproducing method, in which in a case where a recording request is generated while video data which have been stored in a memory until a recording stop request is generated are read out of the memory after the recording stop request is issued, new video data can be prevented from being overwritten on video data which have not been read out yet in the memory (video data which have not been recorded yet on a recording medium).

DISCLOSURE OF INVENTION

In a video recorder/reproducer that writes input video data or its compressed data into a memory and reads out, when the data corresponding to a predetermined capacity are written into the memory, the data from the memory and records the data on a recording medium at the time of recording, a first video recorder/reproducer according to the present invention is characterized by comprising means for continuing, when a recording stop request is inputted during a recording operation, an operation for reading out the data from the memory and an operation for recording the data on the recording medium but stopping the writing of the data into the memory; and means for stopping the recording operation after the readout of the data finally written into the memory and the writing of the data into the recording medium are terminated.

In a video recorder/reproducer that writes input video data or its compressed data into a memory and reads out, when the data corresponding to a predetermined capacity are written into the memory, the data from the memory and records the data on a recording medium at the time of recording, a second video recorder/reproducer according to the present invention is characterized by comprising a circuit for continuing, when a recording stop request is inputted during a recording operation, an operation for reading out the data from the memory and an operation for recording the data on the recording medium but stopping the writing of the data into the memory; and a circuit for stopping the recording operation after the readout of the data finally written into the memory and the writing of the data into the recording medium are terminated.

In a video recording/reproducing method for writing input video data or its compressed data into a memory and reading out, when the data corresponding to a predetermined capacity are written into the memory, the data from the memory and records the data on a recording medium at the time of recording, a first video recording/reproducing method according to the present invention is characterized by comprising the steps of continuing, when a recording stop request is inputted during a recording operation, an operation for reading out the data from the memory and an operation for recording the data on the recording medium but stopping the writing of the data into the memory; and stopping the recording operation after the readout of the data finally written into the memory and the writing of the data into the recording medium are terminated.

In a video recorder/reproducer that alternately writes input video data or its compressed data into two memories for each predetermined block and reads out, when the data corresponding to one block are written into either one of the memories, the data from the memory to record the data on a recording medium at the time of recording, a third video recorder/reproducer according to the present invention is characterized by comprising means for continuing, when a recording stop request is inputted during a recording operation, an operation for reading out the data from the memory and an operation for recording the data on the recording medium but stopping the writing of the data into the memory; means for designating, when a recording request is inputted before the readout of the data finally written into the memory and the writing of the data into the recording medium are terminated, the memory different from the memory from which the data are currently read out as a memory into which new data is to be first written, and then resuming the writing of the data into the designated memory; and means for stopping, when the recording request is not inputted before the readout of the data finally written into the memory and the writing of the data into the recording medium are terminated, the recording operation after the readout of the data finally written into the memory and the writing of the data into the recording medium are terminated.

In a video recorder/reproducer that alternately writes input video data or its compressed data into two memories for each predetermined block and reads out, when the data corresponding to one block are written into either one of the memories, the data from the memory to record the data on a recording medium at the time of recording, a fourth video recorder/reproducer according to the present invention is characterized by comprising a circuit for continuing, when a recording stop request is inputted during a recording operation, an operation for reading out the data from the memory and an operation for recording the data on the recording medium but stopping the writing of the data into the memory; a circuit for designating, when a recording request is inputted before the readout of the data finally written into the memory and the writing of the data into the recording medium are terminated, the memory different from the memory from which the data are currently read out as a memory into which new data is to be first written, and then resuming the writing of the data into the designated memory; and a circuit for stopping, when the recording request is not inputted before the readout of the data finally written into the memory and the writing of the data into the recording medium are terminated, the recording operation after the readout of the data finally written into the memory and the writing of the data into the recording medium are terminated.

In a video recording/reproducing method for alternately writing input video data or its compressed data into two memories for each predetermined block and reading out, when the data corresponding to one block are written into either one of the memories, the data from the memory to record the data on a recording medium at the time of recording, a second video recording/reproducing method according to the present invention is characterized by comprising the steps of continuing, when a recording stop request is inputted during a recording operation, an operation for reading out the data from the memory and an operation for recording the data on the recording medium but stopping the writing of the data into the memory; designating, when a recording request is inputted before the readout of the data finally written into the memory and the writing of the data into the recording medium are terminated, the memory different from the memory from which the data are currently read out as a memory into which new data is to be first written, and then resuming the writing of the data into the designated memory; and stopping, when the recording request is not inputted before the readout of the data finally written into the memory and the writing of the data into the recording medium are terminated, the recording operation after the readout of the data finally written into the memory and the writing of the data into the recording medium are terminated.

BEST MODE FOR CARRYING OUT THE INVENTION

Figure 1:
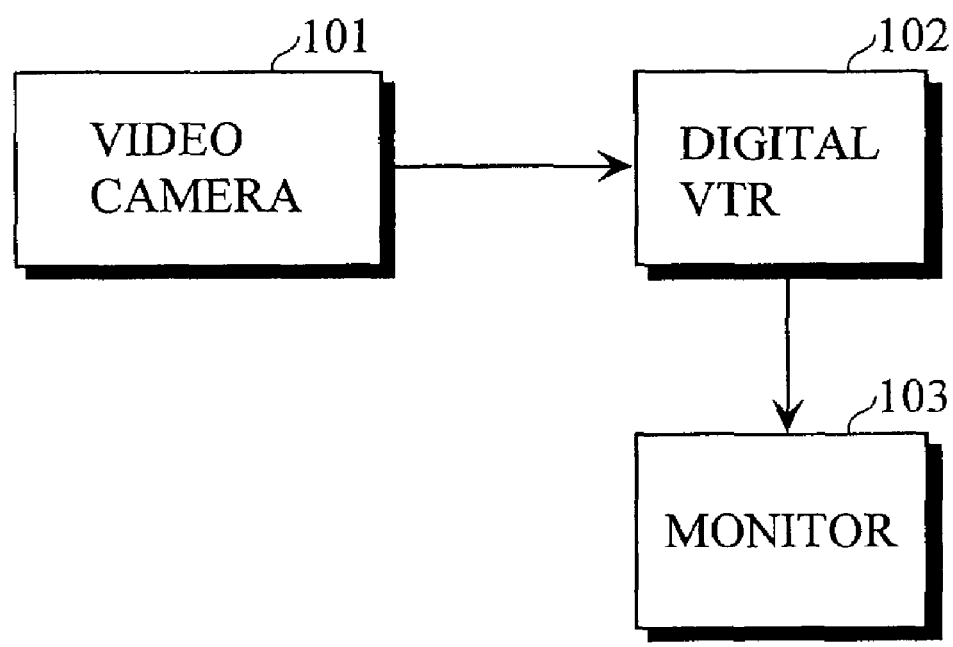
FIG. 1 is a block diagram showing the configuration of a monitoring system.

Referring now to the drawings, description is made of an embodiment in a case where the present invention is applied to a digital VTR that records and reproduces a video picked up by a monitoring camera.

[1] Description of Overall Configuration of Monitoring System

FIG. 1 illustrates the overall configuration of a monitoring system.

The monitoring system comprises a video camera (hereinafter referred to as a monitoring camera) 101, a digital VTR 102 for compressing a video signal obtained by the monitoring camera 101 and recording the compressed video signal on a video tape, and a monitor 103 for displaying a video reproduced by the digital VTR 102.

[2] Description of Operations at Time of Recording of Video Signal Processing Circuit in Digital VTR 102

Figure 2:
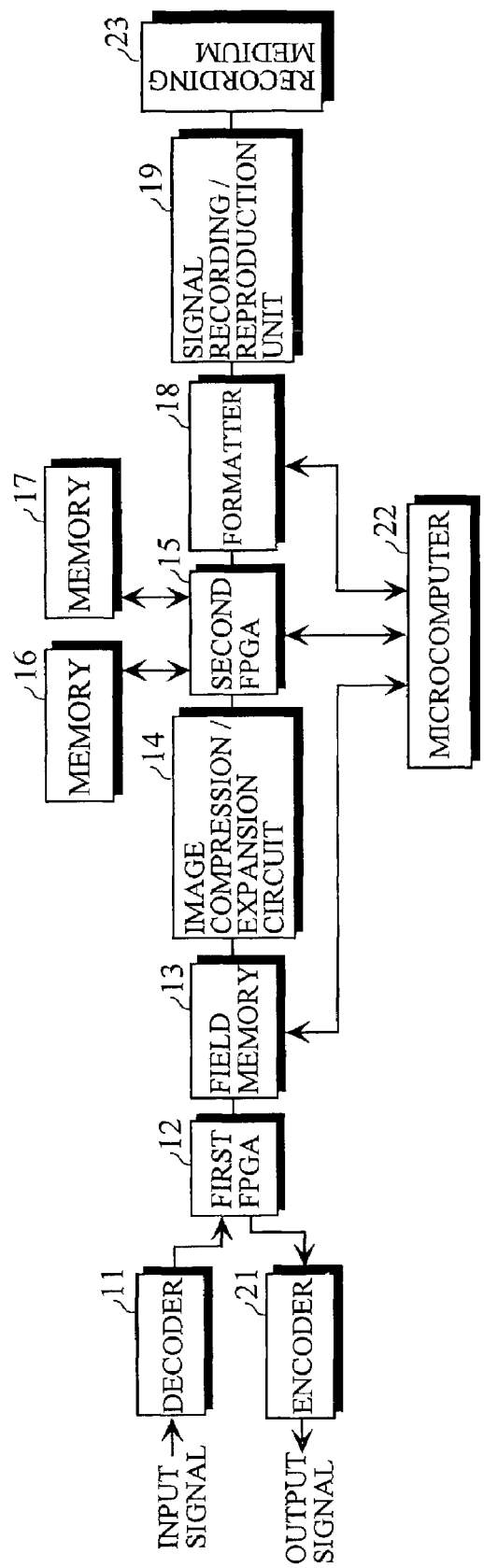
FIG. 2 is a block diagram showing the schematic configuration of a digital VTR.

FIG. 2 illustrates the configuration of the video signal processing circuit in the digital VRT 102. The operations at the time of recording of the video signal processing circuit will be described.

At the time of recording, an analog video signal fed from the monitoring camera 101 is converted into digital video data by a decoder 11. The video data obtained by the decoder 11 is fed to a first FPGA (Field Programmable Gate Array) 12.

The first FPGA 12 stores in a field memory 13 the inputted video data in a period of a predetermined number of fields (hereinafter referred to as an image acceptance period). The video data stored in the field memory 13 are fed to an image compression/expansion circuit 14, and are compressed for each field, for example, in a JPEG system by the image compression/expansion circuit 14. The compressed video data (coded data) obtained by the image compression/expansion circuit 14 is fed to a second FPGA 15.

The second FPGA 15 adds additional information such as recording time information (information related to the current year, month, minute, and second), alarm information, and a camera number to the coded data fed from the image compression/expansion circuit 14. The alarm information is information generated on the basis of an alarm signal generated when it is detected that an important event is generated from the viewpoint of security. For example, the monitoring camera 101 generates an alarm signal when a motion vector of an input video reaches not less than a predetermined value, and transmits the generated alarm signal to a microcomputer 22. Further, the microcomputer 22 generates the alarm signal when an object sensing signal is inputted to the microcomputer 22 from an object sensor externally provided. The camera number is information for identifying, in such a system that videos from a plurality of monitoring cameras are inputted to the digital VTR 102 after being time-divided, information for identifying each of the monitoring cameras.

The second FPGA 15 alternately writes the coded data to which the additional information is added into two memories 16 and 17 for each predetermined block including data corresponding to a plurality of fields, and reads out, every time the data corresponding to one block are written into the memory, the data from the memory into which the data corresponding to one block have been written, and feeds the read data to a formatter 18. One block is composed of data corresponding to 288 tracks, including information related to an audio in this example.

Specifically, the second FPGA 15 writes the coded data to which the additional information is added into one of the memories, for example, the first memory 16. When the writing of the data corresponding to one block into the first memory 16 is terminated, the memory into which the data are to be written is switched to the other second memory 17 and at the same time, the readout of the data from the first memory 16 is started.

The data read out of the first memory 16 is fed to the formatter 18. When the data corresponding to one block have been read out of the first memory 16, the readout is stopped.

Thereafter, when the writing of the data corresponding to one block into the second memory 17 is terminated, the memory into which the data are written is switched to the first memory 16 and at the same time, the readout of the data from the second memory 17 is started. The data read out of the second memory 17 is fed to the formatter 18. When the data corresponding to one block have been read out of the second memory 17, the readout is stopped. Thereafter, the same processing is repeated.

In the formatter 18, the fed data is converted into data having a data structure which can be recorded on a video tape. The data obtained by the formatter 18 is recorded on a video tape (recording medium) 23 through a recording amplifier and a video head in the signal recording/reproduction unit 19. That is, the video data are basically recorded on the video tape 23 for each block (corresponding to 288 tracks). Every time the recording of the data for each block is terminated, the video tape is stopped.

The second FPGA 15 and the formatter 18 are controlled by the microcomputer 22.

Figure 3:
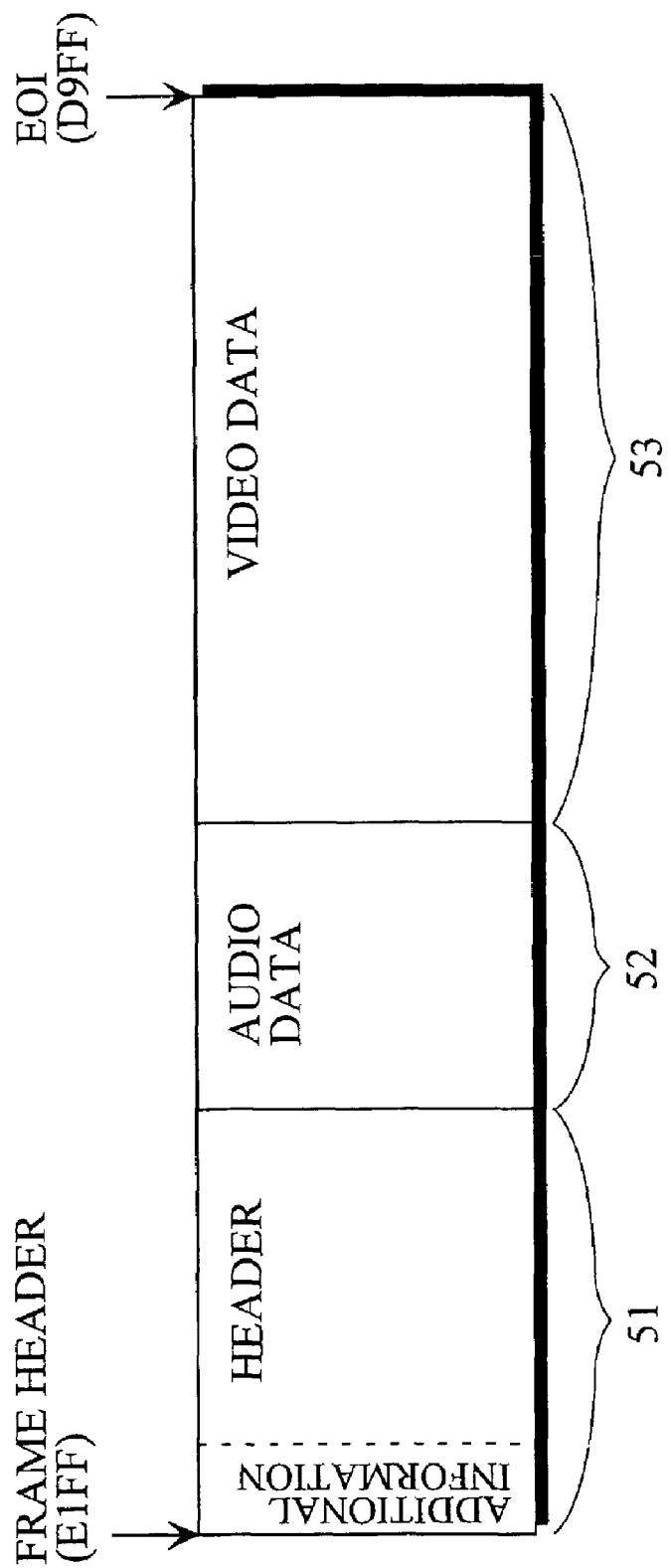
FIG. 3 is a schematic view showing a format for data corresponding to one field recorded on a video tape.

FIG. 3 illustrates a format for data corresponding to one field recorded on a video tape.

A data block corresponding to one field comprises a header 51, audio data 52, and video data 53.

The header 51 includes additional information such as recording time information, alarm information, and a camera number, a quantization table (Q table), an audio added data, and so forth. A frame header (for example, "E1FFh") representing the head of the header 51 is inserted into the head of the header 51. An end code (EOI; for example, "D9FFh") representing the end of the video data 53 is inserted into the end of the video data 53.

[3] Description of Operations in Case where Recording Stop Request is Inputted During Recording Operation A recording stop request is generated in cases where a recording stop button is pressed by a user, the recording end time has come at the time of timer recording, and alarm information is not inputted in alarm recording in which a video is recorded only when an alarm signal is inputted.

Figure 4:
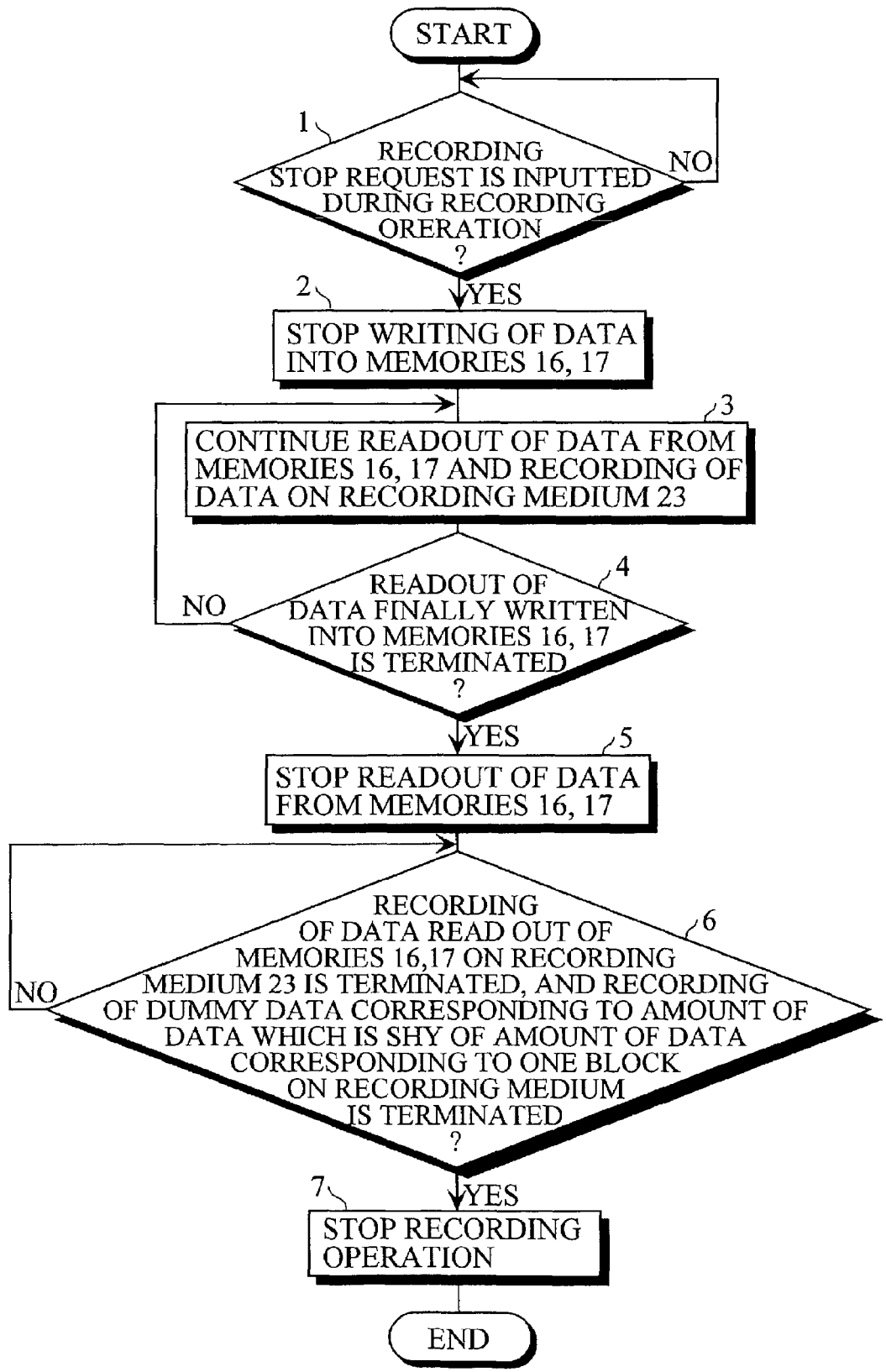
FIG. 4 is a flow chart showing the operations of a microcomputer in a case where a recording stop request is inputted during a recording operation.

FIG. 4 shows the operations of the microcomputer 22 in a case where the recording stop request is inputted during the recording operation.

When the recording stop request is inputted during the recording operation (step 1), the writing of data into the memory 16 or 17 is stopped (step 2).

The readout of the data from the memories 16 and 17 and the recording of the data on the recording medium 23 are continued (step 3). When the readout of the data finally written out of the data stored in the memories 16 and 17 is terminated (YES at step 4), the readout of the data from the memories 16 and 17 is stopped (step 5).

When the recording of the data read out of the memories 16 and 17 on the recording medium 23 is terminated, and the recording of dummy data corresponding to an amount of data which is shy of an amount of data corresponding to one block on the recording medium 23 is terminated (YES at step 6), the recording operation is stopped (step 7).

[4] Description of Operations in Case Where Recording Stop Request is Inputted When Readout of Data from Memories 16 and 17 is Continued After Recording Stop Request is Inputted A recording request is generated in cases where a recording stop button is pressed by a user, the recording start time has come at the time of timer recording, and an alarm signal is inputted in alarm recording in which a video is recorded only when an alarm signal is inputted.

Figure 5:
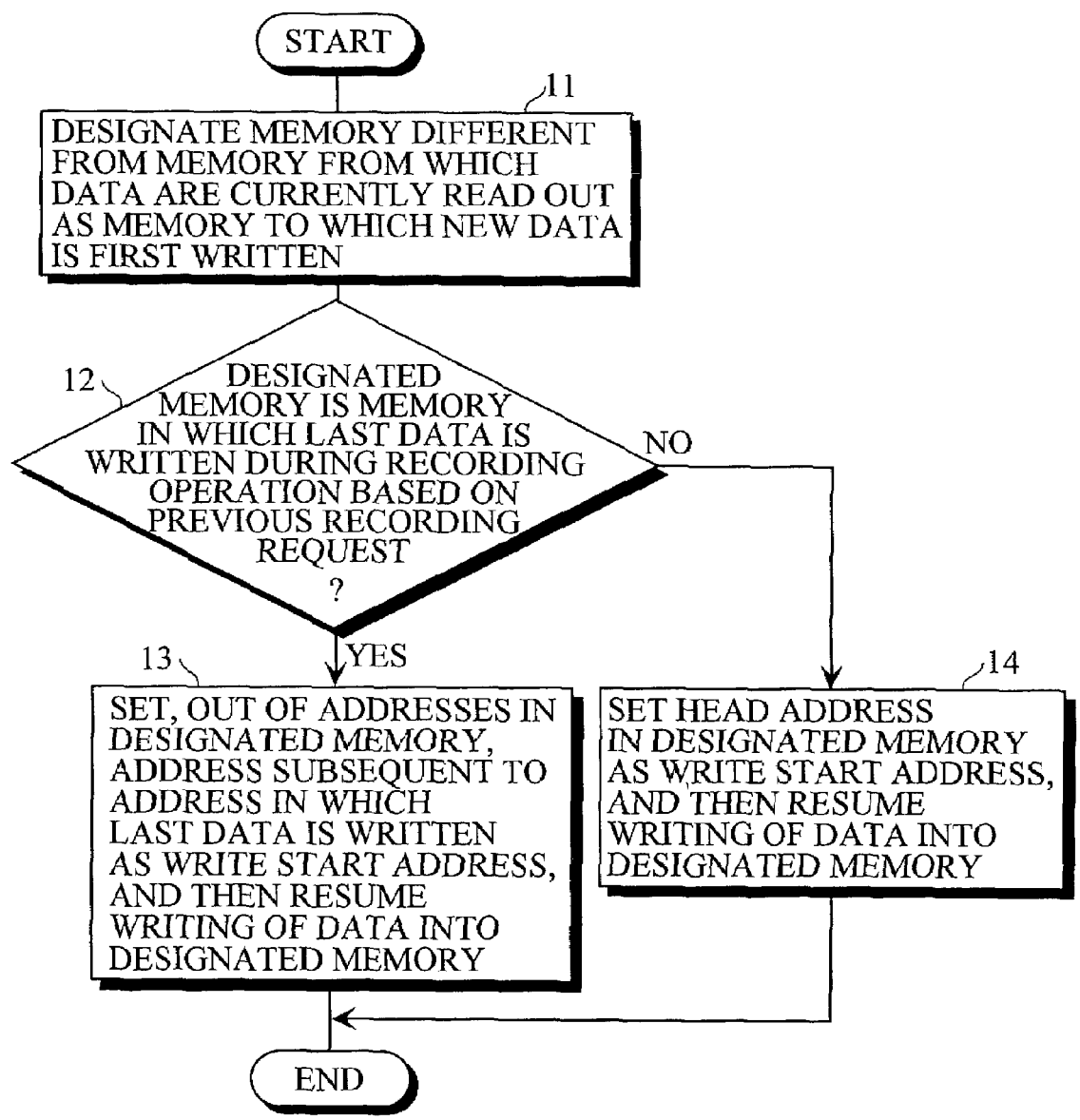
FIG. 5 is a flow chart showing the operations of a microcomputer in a case where a recording request is inputted when the readout of data from a memory and the recording of the data on a recording medium are continued after a recording stop request is inputted.

FIG. 5 shows the operations of the microcomputer 22 in a case where a recording request is inputted when the readout of the data from one of the memories 16 and 17 is continued after a recording stop request is inputted.

In a case where the recording request is inputted when the readout of the data from either one of the memories 16 and 17 is continued after the recording stop request is inputted, the memory different from the memory from which the data are currently read out out of the memories 16 and 17 is designated as a memory into which new data is first written (step 11).

It is judged whether or not the memory designated at the step 11 is a memory in which the last data is written during the recording operation based on the previous recording request (step 12). Consider a case where the memory designated at the step 11 is a memory in which the last data is written during the recording operation based on the previous recording request (the memory from which the data are currently read out is not the memory in which the last data is written during the recording operation based on the previous recording request). In this case, out of addresses in the memory designated at the step 11, the address subsequent to the address in which the last data is written is set as a write start address, and the writing of the data into the memory designated at the step 11 is resumed (step 13).

In this case, when the remaining data in one block are read out of the memory from which the data are currently read out are read out and are recorded on the recording medium, the video tape is stopped once.

When the memory designated at the step 11 is not the memory in which the last data is written during the recording operation based on the previous recording request (the memory from which the data are currently read out is the memory in which the last data is written during the recording operation based on the previous recording request), the head address in the memory designated at the step 11 is set as a write start address, and the writing of the data into the memory designated at the step 11 is then resumed (step 14).

In this case, when the last data written during the recording operation based on the previous recording request is read out of the memory from which the data are currently read out, the readout of the data from the memory is stopped. When the recording of the data read out of the memory is terminated, and dummy data corresponding to an amount of data which is shy of an amount of data corresponding to one block is recorded on the recording medium, the video tape is stopped once.

If it is assumed that the data is read out of the first memory 16, for example, when the recording request is inputted, the second memory 17 is designated as a memory in which new data is first written. Consequently, compressed data (coded data) of video data newly inputted is written into the second memory 17.

Consider a case where the second memory is a memory in which the last data is written during the recording operation based on the previous recording request. In this case, out of addresses in the second memory, the address subsequent to the address in which the last data is written is set as a write start address. When the second memory is not a memory in which the last data is written during the recording operation based on the previous recording request, the head address in the second memory is set as a write start address.

When data, which have not been read out yet, corresponding to one block are stored in the second memory 17, the memory into which the data are to be written is switched to the first memory 16 and at the same time, the readout of the data from the second memory 17 is started.

[5] Description of Operations at Time of Reproduction of Video Signal Processing Circuit At the time of reproduction, data are read for each block from a video tape by a video head in the signal recording/reproduction unit 19. The read video data is fed to the second FPGA 15 through the reproduction amplifier in the signal recoding/reproduction unit 19 and the formatter 18.

The second FPGA 15 alternately writes the fed data (coded data and additional data) into the two memories 16 and 17 for each block, reads out, every time the data corresponding to one block are written into the memory, the data from the memory into which the data corresponding to one block have been written, and feeds the read data to the image compression/expansion circuit 14.

Figure 6:
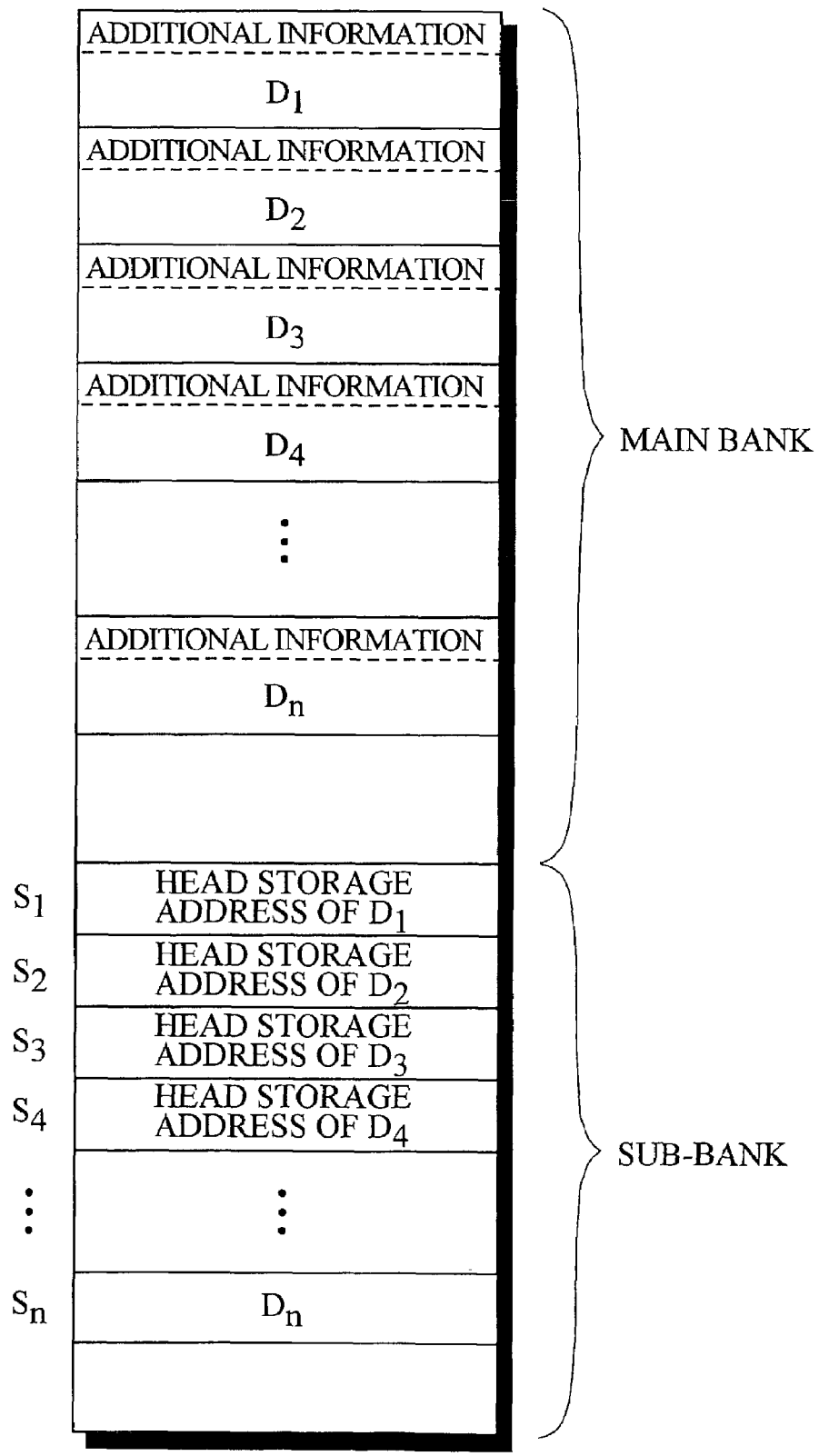
FIG. 6 is a schematic view showing data stored in each of memories 16 and 17 at the time of reproduction.

FIG. 6 illustrates the data stored in each of the memories 16 and 17 by the second FPGA 15. The second FPGA 15 writes for each field the data fed from the formatter 18 into a main bank in each of the memories 16 and 17, and stores an address in which a frame header at the head of each of field data $D_1, D_2, \ldots D_n$ for each field is stored (hereinafter referred to as a head storage address), which are written into the main bank, in a sub bank in the memory 16 or 17 in order that an address in which each of the field data $D_1, D_2, \ldots D_n$ is written can be recognized.

If it is assumed that the field data $D_1, D_2, \ldots D_n$ are written in this order into each of the memories 16 and 17, as shown in FIG. 6, the field data $D_1, D_2, \ldots D_n$ are reproduced in this order at the time of normal reproduction.

At the time of normal reproduction, the microcomputer 22 successively designates addresses $S_1, S_2, \ldots, S_n$ in this order in the sub-bank, so that the field data $D_1, D_2, \ldots D_n$ are read out in this order, and coded video data in the read field data is fed to the image compression/expansion circuit 14.

Description is now made of operations in a case where the microcomputer 22 designates the address $S_1$ in the sub-bank. When the microcomputer 22 designates the address $S_1$ in the sub-bank with respect to the second FPGA 15, the second FPGA 15 acquires the head storage address stored in the designated address $S_1$, and reads out the field data $D_1$ from the acquired head storage address. In this case, additional information such as recording time information is separated from the field data $D_1$. The separated additional information is fed to the microcomputer 22. Further, audio data is separated from the field data $D_1$. The separated audio data is fed to an audio signal processing circuit (not shown). The coded video data in the field data $D_1$ is fed to the image compression/expansion circuit 14.

In the image compression/expansion circuit 14, the fed coded video data is expanded. The video data obtained by the image compression/expansion circuit 14 is stored in the field memory 13. When the video data corresponding to one field are stored in the field memory 13, the video data corresponding to one field are repeatedly read out by the first FPGA 12, and are fed to the encoder 21. In the encoder 21, the fed video data is returned to an analog video signal, and the analog video signal is fed to the monitor 103.

According to the above-mentioned embodiment, the video data which have been stored in the memory until the recording stop request is generated can be recorded on the recording medium.

According to the above-mentioned embodiment, when the recording request is generated while the video data which have been stored in the memory until the recording stop request is generated are read out of the memory after the recording stop request is issued, new video data can be prevented from being overwritten on the video data which have not been read out yet (video data which have not been recorded yet on the recording medium) in the memory.

The invention claimed is:

1. In a video recorder/reproducer that alternately writes input video data or its compressed data into two memories for each predetermined block and reads out, when the data corresponding to one block are written into either one of the memories, the data from the memory to record the data on a recording medium at the time of recording, a video recorder/reproducer being characterized by comprising:

means for stopping, when a recording stop request is inputted during a recording operation, the writing of the data into the memory, while continuing an operation for reading out from the memory the data which have been written into the memory until the writing is stopped as well as an operation for recording the data on the recording medium;

means for designating, when a recording request is inputted before the readout of finally-written data among the data stored in the two memories is terminated, the memory different from the memory from which the data are currently read out as a memory into which new data is to be first written;

means for judging whether or not the designated memory is a memory into which the data was finally written during the recording operation based on the previous recording request;

means for setting an address subsequent to an address into which the data was finally written, as a write start address among addresses in the designated memory if the designated memory is the memory into which the data was finally written during the recording operation based on the previous recording request, and then resuming the writing of the data into the designated memory;

means for setting a head address in the designated memory as the write start address if the designated memory is not the memory into which the data was finally written during the recording operation based on the previous recording request, and then resuming the writing of the data into the designated memory; and means for stopping, when the recording request is not inputted before the readout of the data finally written into the memory is terminated, the recording operation after the readout of the data finally written into the memory and the writing of the data into the recording medium are terminated.

2. In a video recorder/reproducer that alternately writes input video data or its compressed data into two memories for each predetermined block and reads out, when the data corresponding to one block are written into either one of the memories, the data from the memory to record the data on a recording medium at the time of recording, a video recorder/reproducer being characterized by comprising:

a circuit for stopping, when a recording stop request is inputted during a recording operation, the writing of the data into the memory, while continuing an operation for reading out from the memory the data which have been written into the memory until the writing is stopped as well as an operation for recording the data on the recording medium;

a circuit for designating, when the recording request is inputted before the readout of finally-written data among the data stored in the two memories is terminated, the memory different from the memory from which the data are currently read out as a memory into which new data is to be first written;

a circuit for judging whether or not the designated memory is a memory into which the data was finally written during the recording operation based on the previous recording request;

a circuit for setting an address subsequent to an address into which the data was finally written, as a write start address among addresses in the designated memory if the designated memory is the memory into which the data was finally written during the recording operation based on the previous recording request, and then resuming the writing of the data into the designated memory;

a circuit for setting a head address in the designated memory as the write start address if the designated memory is not the memory into which the data was finally written during the recording operation based on the previous recording request, and then resuming the writing of the data into the designated memory; and a circuit for stopping, when the recording request is not inputted before the readout of the data finally written into the memory is terminated, the recording operation after the readout of the data finally written into the memory and the writing of the data into the recording medium are terminated.

3. In a video recording/reproducing method for alternately writing input video data or its compressed data into two memories for each predetermined block and reading out, when the data corresponding to one block are written into either one of the memories, the data from the memory to record the data on a recording medium at the time of recording, a video recording/reproducing method being characterized by comprising the steps of:

stopping, when a recording stop request is inputted during a recording operation, the writing of the data into the memory, while continuing an operation for reading out from the memory the data which have been written into the memory until the writing is stopped as well as an operation for recording the data on the recording medium;

designating, when a recording request is inputted before the readout of finally-written data among the data stored in the two memories is terminated, the memory different from the memory from which the data are currently read out as a memory into which new data is to be first written;

judging whether or not the designated memory is a memory into which the data was finally written during the recording operation based on the previous recording request;

setting an address subsequent to an address into which the data was finally written, as a write start address among addresses in the designated memory if the designated memory is the memory into which the data was finally written during the recording operation based on the previous recording request, and then resuming the writing of the data into the designated memory;

setting a head address in the designated memory as the write start address if the designated memory is not the memory into which the data was finally written during the recording operation based on the previous recording request, and then resuming the writing of the data into the designated memory; and stopping, when the recording request is not inputted before the readout of the data finally written into the memory is terminated, the recording operation after the readout of the data finally written into the memory and the writing of the data into the recording medium are terminated.

* * * * *